(12) United States Patent
Marshall

(10) Patent No.: US 10,557,246 B2
(45) Date of Patent: Feb. 11, 2020

(54) ROLLER FORMS FOR TEMPORARILY SUPPORTING A NEW SLAB FOUNDATION

(71) Applicant: Frederick S. Marshall, Arlington, TX (US)

(72) Inventor: Frederick S. Marshall, Arlington, TX (US)

(73) Assignee: Frederick S. Marshall, Arlington, TX (US)

(*) Notice: Subject to any disclaimer, the term of this patent is extended or adjusted under 35 U.S.C. 154(b) by 0 days.

(21) Appl. No.: 16/181,870

(22) Filed: Nov. 6, 2018

(65) Prior Publication Data

US 2019/0136480 A1 May 9, 2019

Related U.S. Application Data

(60) Provisional application No. 62/583,181, filed on Nov. 8, 2017.

(51) Int. Cl.
*B62B 3/00* (2006.01)
*E02D 27/02* (2006.01)
*E02D 27/50* (2006.01)
*E02D 7/00* (2006.01)

(52) U.S. Cl.
CPC ............ *E02D 27/02* (2013.01); *B62B 3/00* (2013.01); *E02D 7/00* (2013.01); *E02D 27/50* (2013.01)

(58) Field of Classification Search
CPC .......... E02D 27/02; E02D 27/50; E02D 7/00
USPC .............................. 52/167.5, 651.1; 280/79.1
See application file for complete search history.

(56) References Cited

U.S. PATENT DOCUMENTS

| | | | | |
|---|---|---|---|---|
| 4,064,999 A | * | 12/1977 | Young | E04F 21/1811 414/11 |
| 5,913,503 A | * | 6/1999 | Satoh | A47F 3/00 248/562 |
| 5,934,029 A | * | 8/1999 | Kawai | E04H 9/023 52/167.1 |
| 6,148,580 A | * | 11/2000 | Weir | A62B 35/0056 52/651.1 |
| 6,773,218 B1 | * | 8/2004 | Mingoes | E04F 21/1811 254/105 |
| 7,472,518 B2 | * | 1/2009 | Tsai | E04H 9/023 248/562 |
| 8,407,898 B2 | * | 4/2013 | Marshall | E02D 27/01 29/897 |
| 8,834,072 B1 | * | 9/2014 | Donald | E04G 13/00 405/232 |

(Continued)

*Primary Examiner* — Paola Agudelo
(74) *Attorney, Agent, or Firm* — Bracewell LLP; James E. Bradley

(57) ABSTRACT

An assembly supports a concrete slab foundation above a ground surface while being poured and hardened. The assembly includes forms, each of the forms having a frame. Lower rollers are mounted to each of the frames for rolling each of the forms onto the ground surface. Upper rollers are mounted to each of the frames at an elevation above the lower rollers. Upper decks are placed on top of the upper rollers. Each of the upper decks has an upper surface configured to receive the concrete while being poured and hardened. The upper rollers of each of the forms are in rolling engagement with a lower side of one of the upper decks, enabling the forms to be rolled out from under the upper decks after the slab foundation has hardened.

20 Claims, 4 Drawing Sheets

(56) References Cited

U.S. PATENT DOCUMENTS

| | | | |
|---|---|---|---|
| 2002/0166296 A1* | 11/2002 | Kim | E04H 9/023 |
| | | | 52/167.5 |
| 2010/0314849 A1* | 12/2010 | Realegeno-Amaya | |
| | | | B62B 5/0006 |
| | | | 280/79.11 |
| 2012/0043732 A1* | 2/2012 | Itmec | B62B 5/0093 |
| | | | 280/79.11 |
| 2014/0021691 A1* | 1/2014 | Buttazzoni | B62B 3/00 |
| | | | 280/79.11 |
| 2016/0075362 A1* | 3/2016 | Della Polla | B62B 5/0093 |
| | | | 280/79.11 |
| 2016/0144762 A1* | 5/2016 | Bovero | B60P 3/07 |
| | | | 414/430 |
| 2018/0127013 A1* | 5/2018 | Gerhardt | B62H 3/00 |
| 2019/0136480 A1* | 5/2019 | Marshall | E02D 27/02 |

* cited by examiner

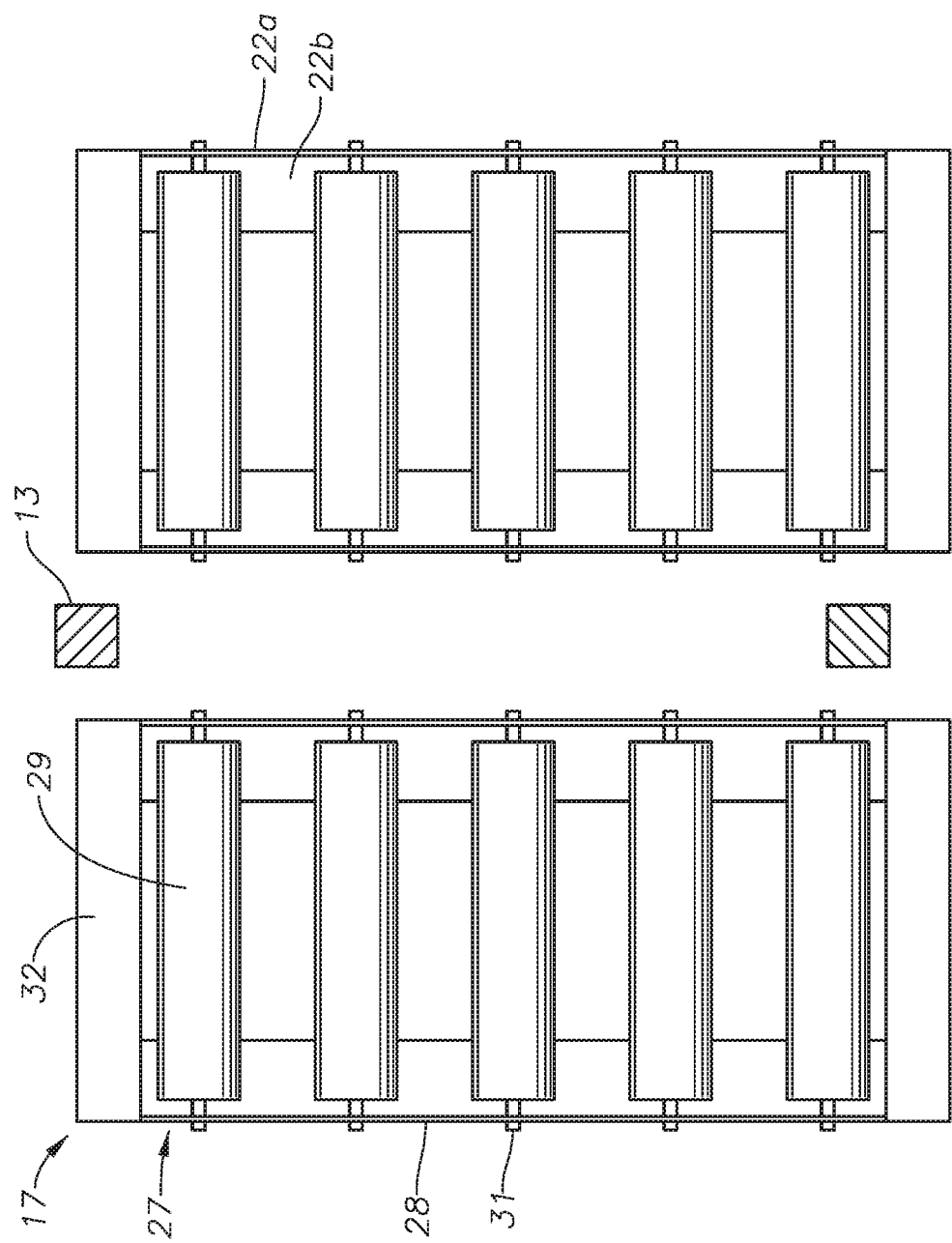

ROLLER FORMS FOR TEMPORARILY SUPPORTING A NEW SLAB FOUNDATION

CROSS-REFERENCE TO RELATED APPLICATION

This application claims priority to provisional application Ser. No. 62/583,181, filed Nov. 8, 2017.

FIELD OF INVENTION

The present disclosure relates to a forms that support a slab foundation while being poured and cured, the forms having rollers enabling the forms to be rolled out from under the slab foundation after the slab foundation has hardened.

BACKGROUND

Many structures are built on foundations or slabs made of concrete poured on a grade of soil. Changes in the weather and moisture levels in the soil may cause the foundation to buckle or crack. The shifting of the soil occurs for a variety of reasons, including uneven changes in the water content of the supporting soil, uneven compacting of the soil, and uneven loads placed on the grade. Various techniques are employed to level and repair foundations that have been damaged.

Another approach has been to pour the foundation on a prepared grade, then raise the foundation a selected distance above the grade before building a structure on the foundation. In this technique, piers are first installed in soil below the grade at various positions. The upper end of each pier will be at or near the grade level. Then, forms are placed on the piers to serve as lifting stations after concrete is poured. A slab foundation may have numerous lifting stations to provide adequate support during and after being lifted. A hydraulic jack or screw jack may be employed with each lifting station to lift the slab foundation. To avoid damage to the foundation while it is being lifted, it is important to keep the foundation substantially level.

U.S. Pat. No. 8,834,072 teaches a method of pouring a slab foundation on fill materials or a variety of forms. After the concrete hardens, the fill material and/or forms are removed from under the slab foundation. This technique results in the foundation being at an elevation above the grade without having to lift it.

SUMMARY

An assembly for supporting a concrete slab foundation above a ground surface while being poured and hardened comprises a plurality of forms, each of the forms having a frame. A plurality of lower rollers are mounted to each of the frames for rolling each of the forms onto and along the ground surface. A plurality of upper rollers are mounted to each of the frames at an elevation above the lower rollers. A plurality of upper decks are placed on top of the upper rollers of each of the forms, each of the upper decks having an upper surface configured to receive the concrete while being poured and hardened. The upper rollers of each of the forms are in rolling engagement with a lower side of one of the upper decks, enabling the forms to be rolled out from under the upper decks and off the ground surface after the slab foundation has hardened.

In the embodiment shown, the upper deck of each of the forms is releasable from a lower side of the slab foundation after the foundation has hardened, enabling the upper decks to be removed from the slab foundation.

The assembly may include a plurality of lower decks for placement on the ground surface. The lower rollers of each of the forms roll on the lower decks prior to the slab foundation being poured and roll on the lower decks after the slab foundation has hardened.

Each of the forms may comprise a pair of upper rails and a pair of lower rails at an elevation below the upper rails. The upper rollers are mounted to the upper rails. The lower rollers are mounted to the lower rails.

The assembly may include means for selectively varying a distance between the upper and lower rails. In the embodiment shown, links extend from the lower rails to the upper rails that support the upper rails above the lower rails. The links have dimensions selected to determine a distance from the lower rollers to the upper deck.

The assembly may include a plurality of piers extending into and protruding above the ground surface for supporting a weight of the slab foundation after the forms have been removed.

BRIEF DESCRIPTION OF THE DRAWINGS

FIG. 4 is a sectional view of the two form assemblies of FIG. 3, taken along the line 4-4 of FIG. 3.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

Figure 1:
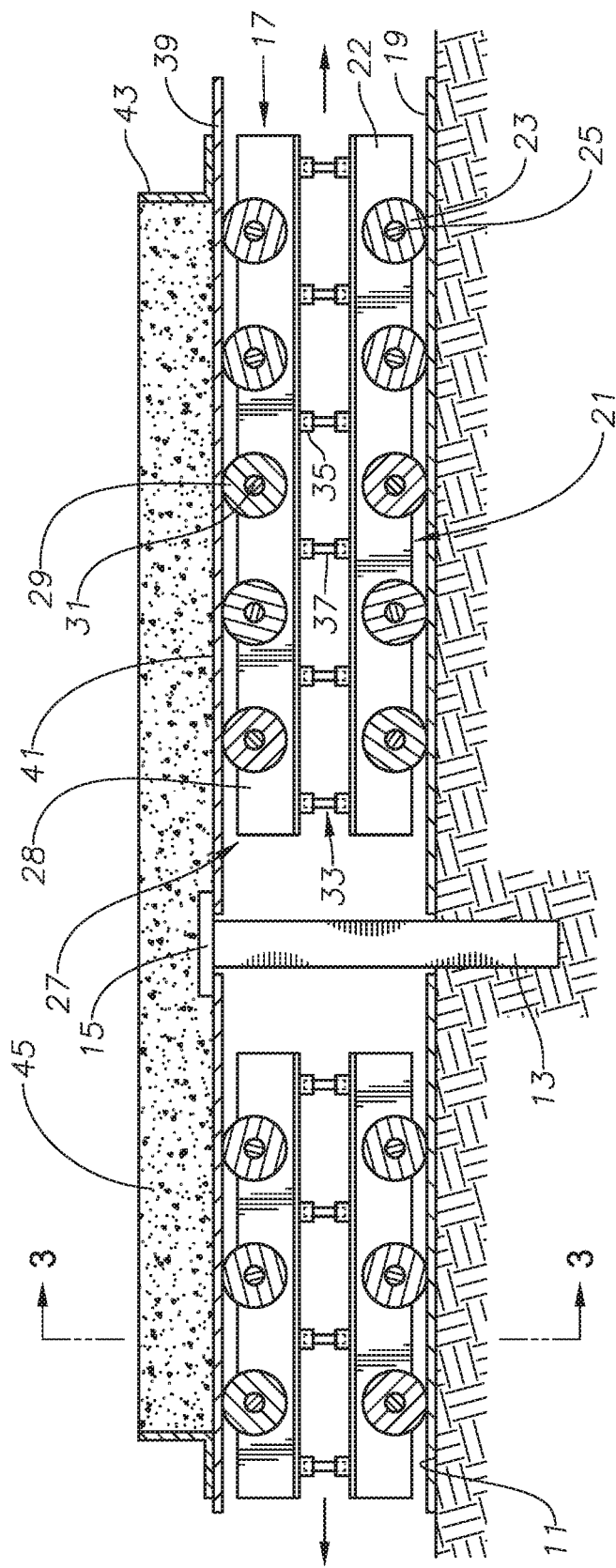
FIG. 1 is a sectional view taken along the line 1-1 of FIG. 3 and showing two form assemblies positioned end-to-end and temporarily supporting part a concrete slab foundation in accordance with this disclosure.

FIG. 1 shows a ground or prepared grade surface 11 having a number of support members or piers 13 (only one shown in FIG. 1) protruding above. Piers 13 may be of various types. One type is a rectangular steel shaft with helical flights; the shaft is rotated to embed the flights in the ground. Another type comprises concrete segments that are driven into the ground. A support member 15 attaches to an upper end of pier 13. Support member 15 may also be of various types, such as a steel plate facing upward from the upper end of pier 13. Also, a number of conduits (not shown) for plumbing and electrical will protrude above ground surface 11.

Two form assemblies 17 are shown in FIG. 1, and in most cases several others would be employed. Each of the form assemblies 17 have the same features, but may have different lengths and widths. For example, the one on the left side of FIG. 1 has a shorter length than the one on the right side. In this example, each form assembly 17 has an end closely spaced to pier 13.

Each form assembly 17 is placed on a fairly rigid, weight supporting lower deck 19 that is temporarily placed on and may be considered to be part of ground surface 11. Lower decks 19 may be formed of sheets of plywood and have thicknesses, such as about ¾ inch, sufficient to support a desired weight.

Figure 3:
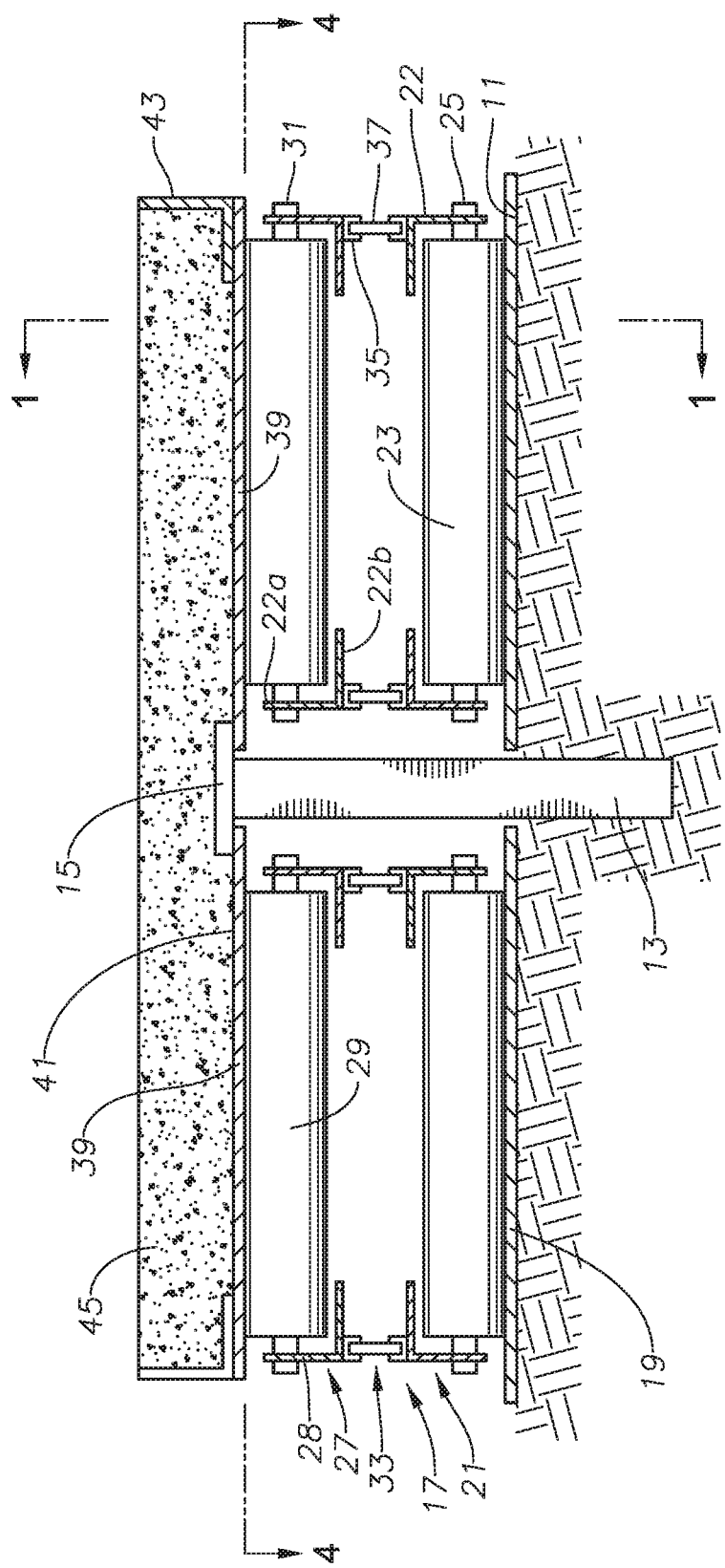
FIG. 3 is a sectional view taken along the line 3-3 of FIG. 1 and showing two of the form assemblies positioned side-by-side.

Referring also to FIG. 3, each form assembly 17 has a frame with a frame lower section 21, which comprises a pair of laterally spaced apart rails 22, each being parallel to a longitudinal axis of frame lower section 21. Each rail 22 may be of steel and have an angle iron configuration with a vertical web 22a intersecting a horizontal web 22b at a 90 degree angle. The lengths of rails 22 may vary, for example, from six feet to eight feet.

A number of lower rollers 23 rotatably mount between the two rails 22 of frame lower section 21. Each lower roller 23 has an axle 25 that is perpendicular to rails 22. Lower rollers 23 may be similar to a conveyor belt roller, having lengths greater than their diameters. The lower side of each lower roller 23 extends below rails 22 and engages lower deck 19. The lengths of rollers 23 may vary, such as from two to four feet as an example. Rollers 23 may also be formed of steel and will roll on lower deck 19.

The frame of form assembly 17 also has a frame upper section 27, which may be constructed the same as frame lower section 21. Frame upper section 27 has upper rollers 29 mounted on axles 31 between a pair of rails 28. The upper ends of upper rollers 29 protrude above the upper edges of rails 28. Frame upper section 27 has the same width and length as frame lower section 21. As shown in FIG. 4, frame upper section 27 may have cross-members 32 that secure between rails 28 at opposite ends of frame upper section 27. Frame lower section 21 may have similar cross-members.

A number of links 33 (FIGS. 1 and 3) support frame upper section 27 above frame lower section 21. Links 33 may be adjustable in length to vary the distance between frame upper section 27 and frame lower section 21. In this example, each link 33 comprises downward protruding sockets 35 attached to the lower edges of upper rails 28. Upward protruding sockets 35 attach to the upper edges of lower rails 22. Pins 37 will slide into the respective sockets 35 to support frame upper section 27 above frame lower section 21. Pins 37 can be of different lengths to vary the distance of frame upper section 27 above frame lower section 21. As an example, the overall height of each form assembly 17 may vary from less than a foot to four feet.

An upper deck 39 will be placed on top of frame upper section 27, with upper rollers 29 in rolling engagement. Upper deck 39 may be of the same material and thickness as lower deck 19. Also, the width and length may be the same, but it could differ. In this example, the width and length of upper deck 39 are approximately the same as frame upper and lower sections 21, 27, but that could vary. A barrier layer 41 to prevent bonding with concrete with overlie upper deck 39. The gaps between each pier support member 15 and adjacent upper decks 39 may be closed in a variety of manners, such as with shims, which may be smaller thickness pieces of plywood. Similarly, gaps between upper decks 39 and each conduit for plumbing and electrical protruding above ground 11 may be closed with shims of plywood.

Lower decks 19 will initially be placed on grade 11, completely covering the dimensions of the foundation to be formed. Form assemblies 17 of various lengths and widths will be rolled onto the lower decks 19 to positions adjacent the various piers 13 and conduits. Some of the form assemblies 17 will be side-by-side, as shown in FIGS. 3 and 4. Some of the form assemblies 17 will be end-to-end as shown in FIG. 1. Preferably, each of the form assemblies 17 is rolled along a straight line from one of the edge of grade 11. Upper decks 39 will be placed on upper rollers 29. The heights of links 33 are selected so that a distance from lower decks 19 to upper decks 39 is substantially the same as a distance from lower decks 19 to pier support plate 15. Perimeter forms 43 will be fixed on upper decks 39 along a designated perimeter. Reinforcing cables (not shown) may be strung between various perimeter forms 43. Workers then pour the concrete on barrier layers 41, resulting in a concrete slab foundation 45.

During pouring and while hardening, piers 13 and form assemblies 17 will support the weight of slab foundation 45. A load path passes from slab foundation 45 through upper deck 39, upper rollers 29, frame upper section 27, links 33, frame lower section 21, and lower rollers 23 to lower deck 19.

After slab foundation 45 hardens sufficiently and reinforcing cables are tensioned, workers will pull form assemblies 17 out from under slab foundation 45. Lower rollers 23 roll on lower decks 19 and upper rollers 29 roll on the lower side of upper decks 39. As illustrated by the arrows in FIG. 1, one of the form assemblies 17 may be pulled to the right to and past an edge of slab foundation 45. The other form assembly 17 in FIG. 1 may be pulled in the opposite direction, to another edge of slab foundation 45. Form assemblies 17 will roll along straight paths parallel with their longitudinal axes. Some of the form assemblies 17 may be located in a central portion of grade 11, and be temporarily blocked from retrieval by other form assemblies 17 closer to an edge of slab foundation 45. Once access exists, workers may employ long hooks (not shown) to engage and roll out these form assemblies 17 without the need for a worker to crawl under slab foundation 45.

As a roller assembly 17 is being removed, its upper deck 39 will fall downward onto lower deck 19. Workers can access the various upper decks 39, in some cases by using a hook engaging a hole provided in each upper deck 39, and drag them out from under slab foundation 45. Then, workers will remove lower decks 19 in the same manner.

Figure 2:
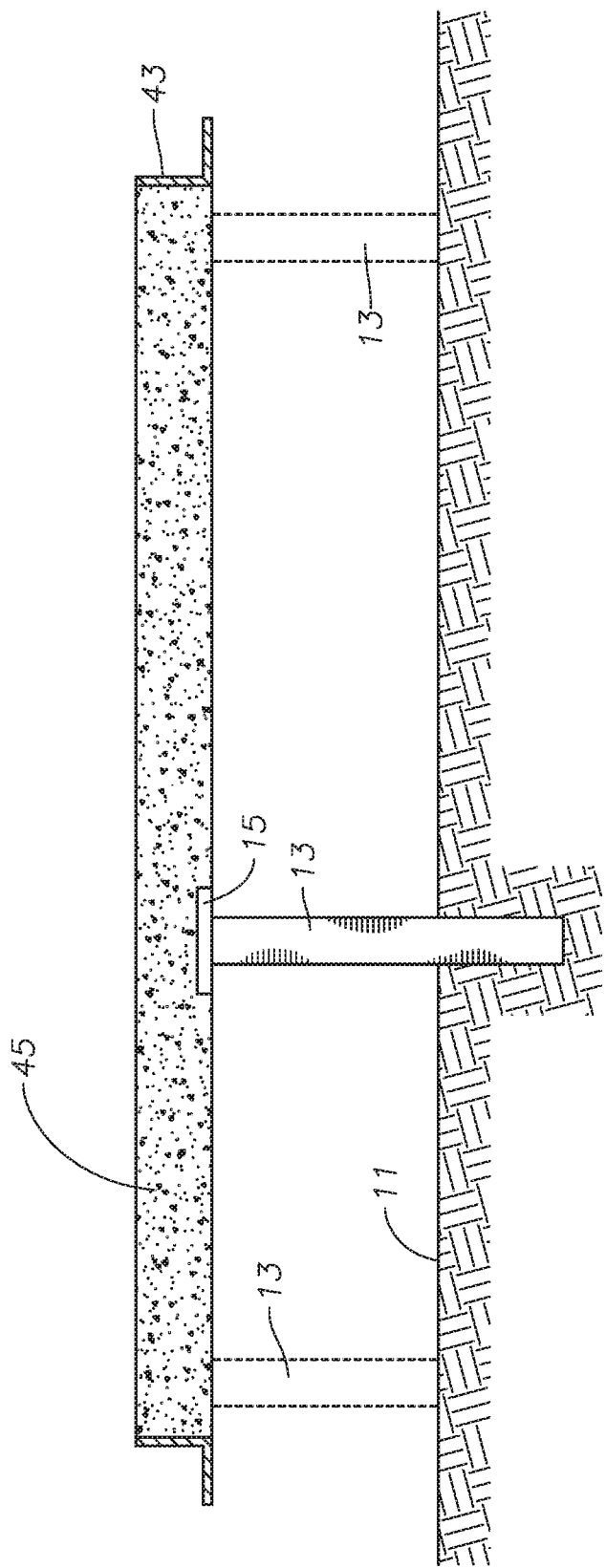
FIG. 2 is a partially sectioned side view of the slab foundation of FIG. 1 after the form assemblies have been removed.

FIG. 2 shows suspended slab foundation 45 after the removal of lower decks 19 and upper decks 39. The concrete of slab foundation 45 bonds to and is supported by support members 15, which in turn are supported on piers 13. Dotted lines indicate other piers 13 not visible in FIG. 1.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

The invention claimed is:

1. An assembly for supporting a concrete slab foundation above a ground surface while being poured and hardened, comprising:
   a plurality of forms, each of the forms having a frame;
   a plurality of lower rollers mounted to each of the frames for rolling each of the forms onto and along the ground surface;
   a plurality of upper rollers mounted to each of the frames at an elevation above the lower rollers;
   a plurality of upper decks, each of the upper decks being placed on top of the upper rollers of one of the forms, each of the upper decks having an upper surface configured to receive the concrete while being poured and hardened; and wherein
   the upper rollers of each of the forms are in rolling engagement with a lower side of one of the upper decks, enabling the forms to be rolled out from under the upper decks and off the ground surface after the slab foundation has hardened.

2. The assembly according to claim 1, wherein:
   the upper deck of each of the forms is releasable from a lower side of the slab foundation after the foundation has hardened, enabling the upper decks to be removed from the slab foundation.

3. The assembly according to claim 1, further comprising:
   a plurality of lower decks for placement on the ground surface; and wherein
   the lower rollers of each of the forms roll on the lower decks prior to the slab foundation being poured and roll on the lower decks after the slab foundation has hardened.

4. The assembly according to claim 1, wherein each of the forms comprises:
   a pair of upper rails;
   a pair of lower rails at an elevation below the upper rails; wherein
   the upper rollers are mounted to the upper rails; and
   the lower rollers are mounted to the lower rails.

5. The assembly according to claim 4, further comprising:
   means for selectively varying a distance between the upper and lower rails.

6. The assembly according to claim 4, comprising:
   links extending from the lower rails to the upper rails that support the upper rails above the lower rails, the links having dimensions selected to provide a desired from the lower rollers to the upper deck.

7. The assembly according to claim 1, further comprising:
   a plurality of piers extending into and protruding above the ground surface for supporting a weight of the slab foundation after the forms have been removed.

8. An assembly for supporting a concrete slab foundation above ground while being poured and hardened, comprising:
   a rigid lower deck for placement on a grade surface of the ground;
   a frame having a longitudinal axis;
   a plurality of lower rollers mounted to the frame and in rolling engagement with the lower deck, each of the lower rollers having a lower axle perpendicular to the longitudinal axis;
   a plurality of upper rollers mounted to the frame at an elevation above the lower rollers, each of the upper rollers having an upper axle perpendicular to the longitudinal axis;
   a rigid upper deck placed on top of the upper rollers such that the upper rollers are in rolling engagement with a lower side of the upper deck; wherein
   the upper deck has an upper surface configured to receive the concrete while being poured, defining a load path through the upper deck, the upper rollers, the frame, the lower rollers, and the lower deck while the slab foundation hardens; and
   the upper and lower rollers enable the frame to be pulled outward from between the upper and lower decks after the slab foundation has hardened.

9. The assembly according to claim 8, wherein:
   the frame comprises two longitudinally extending and laterally spaced apart rails.

10. The assembly according to claim 8, wherein each of the rollers has a diameter that is less than a laterally extending length of each of the rollers.

11. The assembly according to claim 8, wherein the frame comprises:
    a pair of laterally spaced apart and longitudinally extending upper rails;
    a pair of laterally spaced apart and longitudinally extending lower rails at an elevation below the upper rails; wherein
    the axles of the upper rollers are mounted to the upper rails; and
    the axles of the lower rollers are mounted to the lower rails.

12. The assembly according to claim 11, further comprising:
    links extending from the lower rails to the upper rails that support the upper rails above the lower rails.

13. The assembly according to claim 12, wherein each of the links is variable in height.

14. The assembly according to claim 12, wherein each of the links comprises:
    a downward facing upper socket mounted to one of the upper rails;
    an upward facing lower socket mounted to one of the lower rails; and
    a pin that has an upper end releasably received in the upper socket and a lower end releasably received in the lower socket.

15. The assembly according to claim 8, further comprising:
    a plurality of piers extending into and protruding above the grade surface for supporting a weight of the slab foundation after the forms have been removed.

16. A method for constructing a concrete slab foundation above a ground surface, comprising:
    installing piers into the ground surface at selected distances apart from each other;
    rolling a plurality of forms onto and along the ground surface adjacent the piers, each of the forms having a frame, lower rollers and upper rollers mounted to the frame;
    placing upper decks on top of the upper rollers;
    pouring concrete onto the upper decks and allowing the concrete to harden into the slab foundation, at least part of the weight of the slab foundation passing downward through the upper rollers, the frame, the lower rollers into the ground surface; then
    moving each of the forms out from under the slab foundation, causing the upper rollers to roll along a lower side of the upper decks and the lower rollers to roll along the ground surface.

17. The method according to claim 16, further comprising:
    placing a barrier layer on the upper decks, preventing the concrete from bonding to the upper decks; and wherein, moving each of the forms out from under the slab foundation causes the upper decks to fall downward from the slab foundation onto the ground surface.

18. The method according to claim 16, further comprising:

placing lower decks on the ground surface prior to moving the forms onto the ground surface; wherein moving each of the forms out from under the foundation comprises rolling the lower rollers along the lower decks; and the method further comprises:

removing the lower decks from the ground surface after the forms have been removed.

19. The method according to claim 16, wherein:

a distance from the ground surface to upper ends of the piers is substantially the same as a distance from the lower rollers to the upper decks.

20. The method according to claim 16, further comprising:

adjusting a dimension from the lower rollers to the upper rollers prior to moving the forms onto the ground surface.

\* \* \* \* \*